United States Patent
Poindexter et al.

[15] 3,643,376
[45] Feb. 22, 1972

[54] PRODUCTION OF SEED SPROUTS

[72] Inventors: Everton G. Poindexter; Hugh M. Scott, both of Monroe, Conn. 06468

[22] Filed: Oct. 8, 1969

[21] Appl. No.: 864,737

Related U.S. Application Data

[63] Continuation-in-part of Ser. No. 736,468, June 12, 1968, abandoned, Continuation-in-part of Ser. No. 651,591, July 6, 1967, abandoned.

[52] U.S. Cl. ................................................................47/1.2
[51] Int. Cl. ........................................................A01g 31/02
[58] Field of Search ..................................47/1.2, 14, 16

[56] References Cited

UNITED STATES PATENTS

| 2,296,849 | 9/1942 | Hammerstrom et al. | 47/16 |
| 2,436,652 | 2/1948 | Lee | 47/1.2 |
| 2,750,713 | 6/1956 | Chin | 47/14 |
| 2,810,988 | 10/1957 | Chin | 47/14 |
| 2,928,211 | 3/1960 | Martin | 47/1.2 |
| 3,328,912 | 7/1967 | Poon | 47/1.2 |

Primary Examiner—Robert E. Bagwill
Attorney—Pennie, Edmonds, Morton, Taylor and Adams

[57] ABSTRACT

Sprouting various seeds and growing these sprouts for the purpose of providing edible sprouts as a vegetable.

5 Claims, 2 Drawing Figures

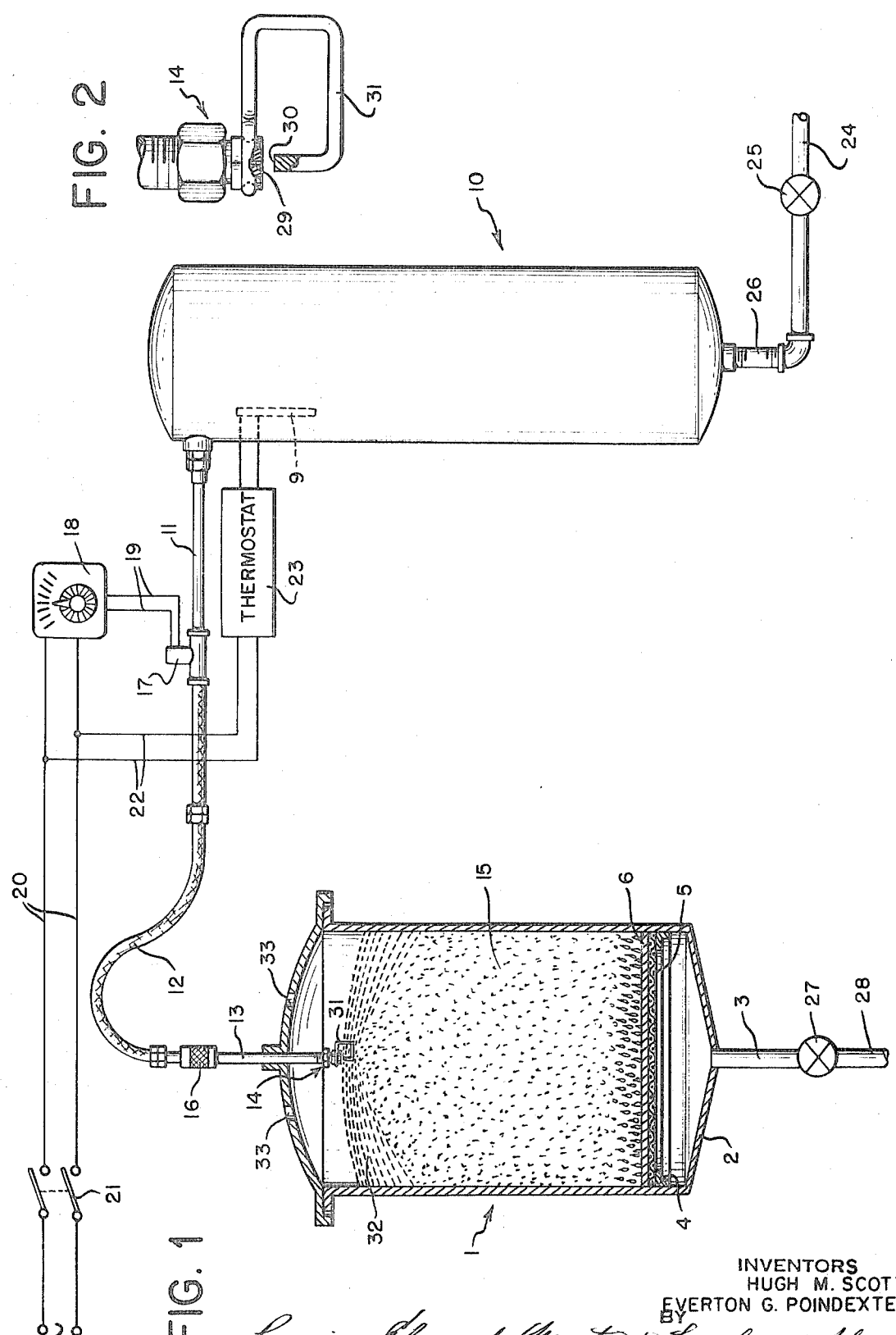

PRODUCTION OF SEED SPROUTS

This application is a continuation-in-part of application, Ser. No. 736,468 filed June 12, 1968 and application, Ser. No. 651,591, filed July 6, 1967, both abandoned.

BACKGROUND OF THE INVENTION

1. Field of the Invention

See Above.

2. Description of the Prior Art

Chin U.S. Pat. No. 2,750,713 relates to the growing of bean sprouts for food. A bed of the beans is immersed in a body of water every 4 hours under the control of a time switch and a float-operated switch which cuts off the flow of water only when the beans and sprouts have been completely submerged. The water is sprayed onto the beans and sprouts through a perforated pipe. Four days are required for the sprouts to be ready for removal and consumption.

Martin U.S. Pat. No. 2,928,211 relates to an apparatus for growing grass and oats for livestock in quantity production. The growing is on superposed trays within a cabinet. The seeds and sprouts are wetted "periodically" 4 minutes in each hour by spraying. Water is collected at the bottom of the cabinet and recirculated through a filter. Artificial light is provided within the cabinet to enhance growth. A nutrient liquid is employed for the same purpose instead of merely water. Seven days are required for adequate growth.

Hammerstrom et al. U.S. Pat. No. 2,296,849 relates to apparatus for growing soy beans for food. Warm water is delivered by sprinklers onto beans arranged in trays. A timing valve for this purpose opens at intervals varying from ½ hour to 2 hours. No mention is made of the growing time.

SUMMARY OF THE INVENTION

The present invention is directed particularly to the germination of mung beans and the growing of mung bean sprouts although sprouts may also be grown from other seeds such as soy beans, corn, wheat and barley using the method and apparatus of this invention.

It has been found that there are enzymes which develop in the natural growth cycle of bean sprouts. These enzymes are manufactured in the roots of the growing organisms and ooze out of the ends of the roots. Their purpose seems to be to attack and penetrate the soil of the natural growing bed and thus make it easier for the roots to penetrate this soil. However, in the growing tank for seed sprouts there is no soil and the enzymes attack the growing organism itself and inhibit its growth. See "Journal of Experimental Botany" for Nov., 1966, pp. 750 etseq., an article by I.K. Smith and L. Fowden; also "Pytopathology" for Aug., 1967, pp. 867 etseq., an article by Kraft & Erwin entitled "Mung Bean Exudates." The enzymes in question include glutamic acid, serine, glycene, theonine, alpha-alamine, valine and others.

Any of these enzymes develop continuously throughout the growth cycle of the sprouts and will inhibit the sprout growth unless removed. One of the features of the present invention is the removal of these enzymes in such a way that they do not interfere with the growth of the bean sprouts. This is accomplished by passing water particles over the growing sprouts by introducing a mist of water above the seed bed in the growing tank. The mist condenses on at least the uppermost layer of seeds in the bed and water particles continuously pass through the growing seed and sprout organisms so that the action of the inhibiting enzymes is constantly thwarted.

The use of intermittent water sprays as required in the methods of the above mentioned prior patents produces periods of varying lengths of time when no water particles are seeping through the bed and removing the inhibiting enzymes. The growth of the sprouts thus produced is retarded and a much longer period is required. The shortest growth period according to any of the above patents is four days whereas mung grown sprouts have been repeatedly produced in accordance with the present invention in a period of 60 hours or 2½ days.

A further disadvantage of the use of sprays is to be found in the damage done to the growing sprouts. A continuous spray stream striking a sprout can break it in two pieces. Also the growth direction of a small sprout may be constantly changed by the force of the spray and this will produce a crooked sprout growth, sometimes following helical pattern. Such sprouts are less desirable to eat and are harder to package.

When water sprays are used as in the prior patents the spray head must be adjust for coverage of the sprouts for one of two conditions as follows: Either the head must be adjusted to cover the sprouts as they begin to grow, in other words to cover the starting seed bed, or the spray head must be adjusted for the end of the growth period and have the water build up on and wash the walls of the tank. In the first situation as the sprouts grow the coverage by the water spray will diminish leaving an unwatered area of sprouts. Under the second condition the water washing down the walls of the tank will push the small fragile bean seeds toward the center and can damage these seeds as described above.

Under either of these conditions unequal growth of the sprouts will result.

In accordance with the invention, water alone, without the addition of any nutrient, and at a temperature sufficient to induce seed germination and the growth of the sprouts is introduced as a fine mist or fog of water vapor above the seed bed and in sufficient amount to fill the treating zone above the bed. The water is allowed to condense on the top layer of the seeds and to slowly seep down through the lower layers. The amount of water necessary to properly wet the seeds and resulting sprouts may be varied from time to time in accordance with the changing growth conditions. This is accomplished without interfering with the seepage of the condensed fog or mist through the lower layers of the seeds which removes or rinses away the enzymes which develop by the growth of the sprouts and which tend to inhibit such growth. There is never any interference with this constant removal of the enzymes.

Such variation in the amount of water required by the seed and sprout growth without interfering with the carrying away of the enzymes is accomplished by introducing the fine mist or vapor of water above the seed bed in frequent, short applications. Advantageously the cycles of water application are about 60 seconds in duration of which during from 10 to 30 seconds the fine mist is introduced, and during the remainder of such cycle the fine mist of water is cut off. The variation of the mist application time between 10 and 30 seconds of the 60 second cycle enables the operator to control the amount of water that wets the seed bed and the growing sprouts, but without interfering with the continuous removal of the enzymes.

The frequent misting just described produces a high humidity within the bed of beans and sprouts, very nearly 100 percent.

The temperature of the water producing fine mist is held within a range of from 90° to 110° F. The temperature in the bed of seeds and sprouts will be only slightly lower. The core temperature is only slightly higher than the remainder of the bed and this more uniform tank temperature is maintained throughout the growing period and a more uniform growth of the sprouts results, i.e., sprouts of similar length and thickness throughout the bed.

By our more frequent watering we are able not only to remove the enzymes mentioned previously but also sugar, glucose, frutose and sucrose and to speed up the growth of the sprouts.

The apparatus for carrying out the method in accordance with this invention includes a source of warm water the temperature of which is closely controlled. This may be either from a tank heated electrically or otherwise and provided with a suitable control thermostat, or from sources of hot and cold water and a thermostatically controlled mixing valve.

The enclosure for the seeds is a container or growing tank or box of any desired shape and size and provided with a cover or door through which the seeds are introduced and the grown sprouts removed and which is closed from the beginning to the end of the growing period to confine the seed and exclude light but which is arranged to admit sufficient air for germination and growth. Within this container there is a suitable support for the bed of seeds so arranged as to allow the water seeping through the seeds to drain through the support without restriction and be discharged through a drainage outlet from the container.

Warm water is delivered through or near the top of the container by means of a conduit or hose and to a misting device or mister which produces a fine mist of water distributed uniformly throughout the area of the container. A solenoid operated valve is placed in the conduit leading to the mister and a time switch is arranged for the control of this valve.

Such time switch or pulser is adjusted to cause the misting to take place for a few seconds followed by a cutoff period of a few seconds, the complete cycle being about 1 minute. The on-and-off periods can be varied but are of short duration being measured in seconds rather than in minutes or hours.

BRIEF DESCRIPTION OF THE DRAWING

FIG. 1 is a diagrammatic illustration of one form of apparatus we have devised for growing seed sprouts in accordance with our present invention.

FIG. 2 is an enlarged view partly in section, of the misting device.

DESCRIPTION OF THE PREFERRED EMBODIMENT

Referring to the drawing the growing tank is indicated at 1 and as shown is an upright cylindrical container having a conical bottom 2 at the center of which is a drainpipe 3. The tank may be of any desired and suitable shape and size to accommodate the amount of produce to be grown. It may be made of plastic, metal, plastic lined metal, fiberglas or other material. The inner surface should be nonheat conducting or the vessel suitably insulated.

At a suitable distance above the bottom brackets 4 are mounted on the interior wall of the tank and a shelf 5 of 6 to 8 inches mesh screen is placed upon these brackets. On the upper surface of this screen there is a perforated plastic sheet or plate 6. The seeds, such for example as mung beans, are arranged in a seed bed 7 on the upper surface of perforated sheet 6 which serves as a nonheat-conducting support.

As shown the seed bed 7 consists of about three layers of beans, but the thickness of this bed may be greater and depends to a great extent on the height of the tank. The bean sprouts grow in superposed layers as is usual with bean sprouts, the sprouts in each layer growing to a height of from 3 to 4 inches. When fully grown these superposed layers may reach approximately to the top of growing tank 1 depending upon its size.

Growing tank 1 is provided with a removable cover 8 which fits the upper circular rim of the tank, a flanged construction being shown. Cover 8 is removed for the placing of the seed bed 7, and, later on, for the removal of the grown sprouts.

Warm water for the growing of the sprouts may be supplied in any convenient way so long as its temperature is closely regulated. As shown an electrically heated water supply tank 10 is provided which advantageously is insulated to conserve heat. An outlet pipe 11 near the top of tank 10 extends to the vicinity of growing tank 1 terminating in a flexible hose 12.

Hose 12 conducts the warm water to a short length of pipe 13 which is mounted in an aperture in cover 8 and is provided at its lower end with a misting nozzle 14 of special construction which produces an extremely fine slow settling mist 15 and delivers this mist uniformly throughout the entire area of the tank forming a body of watery vapor or fog above seed bed 7, and later on over the entire area of the growing sprouts.

The misting nozzle 14 as shown in FIG. 2 disperses a very fine mist by first directing a small stream of water through an orifice 29 onto a flat end 30 of a larger diameter rod 31. The stream is then broken up in a nearly 360° direction and converted into small particles.

The small stream of water from orifice 29 strikes the smooth flat surface 30 and is split into an almost infinite number of tiny streams which are projected radially in all directions around nozzle 14 and within tank 1. These minute streams are indicated by the dotted lines 32 in FIG. 1 and are located nearly in a horizontal plane, the minute streams being so tiny that they soon break up and form a cloud of fog or mist 15 before they have reached a point very far from the center of the tank. The pressure of the water entering nozzle 14 is from 40 to 50 pounds per square inch. The higher the pressure the finer the mist and the nearer the streams 36 approach a flat plane.

The fine mist or fog 15 completely fills the tank above the seed bed 7 and the bed of combined seeds and sprouts as the growing proceeds. This mist wets and condenses on the uppermost layer of the seeds and forms into droplets which seep downwardly by gravity through the lower layers of the seeds, then pass through the perforated plate 5 and drain out through drain pipe 3. As the seed sprouts grow the mist condenses on the upper portions of the sprouts into droplets which descend by gravity keeping the sprouts wet and also the seeds of the lower layers.

To enable the cover 8 to be removed from the vicinity of the growing tank for cleaning purposes or otherwise, a quick coupling device 16 may be provided between hose 12 and the upper end of pipe 13.

An electromagnetic valve 17 is arranged in pipe 11 to control the delivery of the mist from mister 14 to the interior of the growing tank. This electromagnetic valve is controlled by a timing device 18 of conventional construction and which is connected to valve 17 by the wires 19. Current is supplied to time switch 18 through wires 20 leading from a main switch 21. Conductors 22 which are connected to wires 20 lead through a thermostat 23 to a conventional heating element 9 within tank 10.

It will be understood that the time switch 18 is arranged so that the duration of the misting periods, as well as the intervals between these periods can be adjusted as desired. For example, timing device 18 can be adjusted to cause the valve 17 to remain open for a period of, say, 10 seconds. At the end of such period the valve will be closed, to be reopened after an interval, of, say, 50 seconds. With mung beans forming the seed bed 7 and the temperature of the warm water closely controlled at 100° F. the bean sprouts have been grown as above described in 60 hours.

It will also be understood that although tank 1 is closed so as to exclude light it is so arranged as to admit sufficient ambient air to facilitate the germination and growth of the seeds and sprouts. This may be done for example by placing a few small holes 33 in the cover 8.

With a supply of fresh water available it is delivered through a supply pipe 24, a valve 25 and intake pipe 26 to the bottom of tank 10. After being heated in this tank by heating element 9, the warm water passes through pipe 11 at the top of the tank to the mister 14 as previously described.

We claim:

1. The method of growing seed sprouts which comprises:
    a. providing a bed of seeds of substantially uniform thickness within a confined treating zone;
    b. periodically introducing into said zone a fine mist or fog of water above the seed bed and in sufficient amount to fill the treating zone above the seed bed with a mist or fog of water vapor, and to provide water for constant seepage through the seed bed;
    c. maintaining a sufficient temperature in the treating zone to induce seed germination and to cause the formation of droplets of water at least on the top layer of the seeds;
    d. and removing from the bottom of the seed bed any water not absorbed by the seeds or sprouts;
    the amount of water being passed through the seed bed by condensation of the mist or fog being sufficient to remove or rinse enzymes which develop during the growth of the sprouts.

2. The method of growing seed sprouts according to claim 1 wherein the humidity in the bed of seeds and growing sprouts is maintained at approximately 100 percent.

3. The method of growing seed sprouts according to claim 1 wherein the temperature of the water which produces the mist is maintained approximately constant at a temperature within the range of from 90° to 110° F.

4. The method of growing seed sprouts according to claim 1 wherein the mist is introduced into the treating zone during predetermined on-and-off periods of short duration measured in seconds until the sprouts attain the desired growth.

5. The method of growing seed sprouts according to claim 4 wherein the seeds are mung beans.

\* \* \* \* \*